United States Patent
Honegger et al.

(10) Patent No.: US 8,061,505 B2
(45) Date of Patent: Nov. 22, 2011

(54) DEVICE AND METHOD FOR CONVEYING AND ALIGNING FLAT PRODUCTS

(75) Inventors: Werner Honegger, Bach (CH); Marcel Schneider, Cham (CH)

(73) Assignee: Ferag AG, Hinwil (CH)

( * ) Notice: Subject to any disclaimer, the term of this patent is extended or adjusted under 35 U.S.C. 154(b) by 116 days.

(21) Appl. No.: 12/568,405

(22) Filed: Sep. 28, 2009

(65) Prior Publication Data

US 2010/0078292 A1   Apr. 1, 2010

(30) Foreign Application Priority Data

Sep. 29, 2008 (CH) ....................................... 1537/08

(51) Int. Cl.
*B65B 11/18* (2006.01)
(52) U.S. Cl. ............... 198/419.3; 271/243; 198/812; 198/431; 198/731
(58) Field of Classification Search ............ 198/419.3, 198/813, 465.1–465.3, 731; 271/243
See application file for complete search history.

(56) References Cited

U.S. PATENT DOCUMENTS

| | | | | |
|---|---|---|---|---|
| 3,057,456 A * | 10/1962 | Hans Heinzer | ............ | 198/465.1 |
| 3,190,434 A * | 6/1965 | Dardaine | ................... | 198/419.3 |
| 3,368,660 A * | 2/1968 | Standley et al. | ........... | 198/419.3 |
| 3,872,647 A * | 3/1975 | Langen et al. | .................. | 53/157 |
| 3,964,598 A * | 6/1976 | Alsop | ............................ | 198/415 |
| 4,502,592 A * | 3/1985 | Ramcke | ...................... | 198/626.5 |
| 4,552,261 A * | 11/1985 | Raudat et al. | ............... | 198/419.3 |
| 5,072,573 A | 12/1991 | Tisma | | |
| 5,081,821 A * | 1/1992 | Meives | ........................... | 53/466 |
| 5,657,615 A * | 8/1997 | Muller | ........................... | 53/448 |
| 5,806,659 A * | 9/1998 | Middelberg et al. | .......... | 198/731 |
| 6,293,544 B1 * | 9/2001 | Fedinatz | ....................... | 271/243 |
| 6,868,653 B2 | 3/2005 | Ballestrazzi et al. | | |
| 2003/0136086 A1 | 7/2003 | Kalany et al. | | |
| 2009/0250319 A1 * | 10/2009 | Bonnain | ........................ | 198/731 |

FOREIGN PATENT DOCUMENTS

| | | |
|---|---|---|
| DE | 3335583 | 4/1985 |
| EP | 1410992 | 4/2004 |

* cited by examiner

*Primary Examiner* — Mark A Deuble
(74) *Attorney, Agent, or Firm* — Rankin, Hill & Clark LLP

(57) ABSTRACT

A conveying device for conveying and aligning flat products or stacks of flat products, in particular printed products, includes leading pins for stop on a leading edge of conveyed products and trailing pins or pushers for stop on a trailing edge of the conveyed products. The products are insertable between the leading and trailing pins and are thus aligned by the pins. A distance between successive pushers is adjustable without parts of the device having to be exchanged.

13 Claims, 4 Drawing Sheets

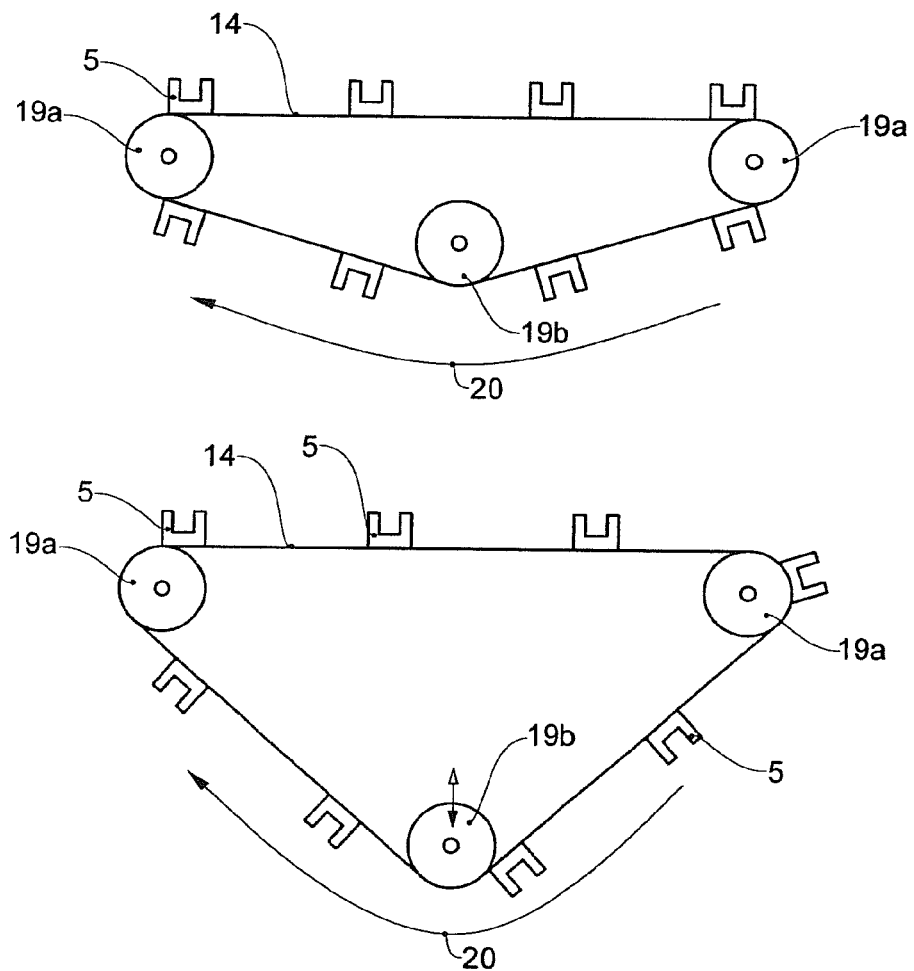
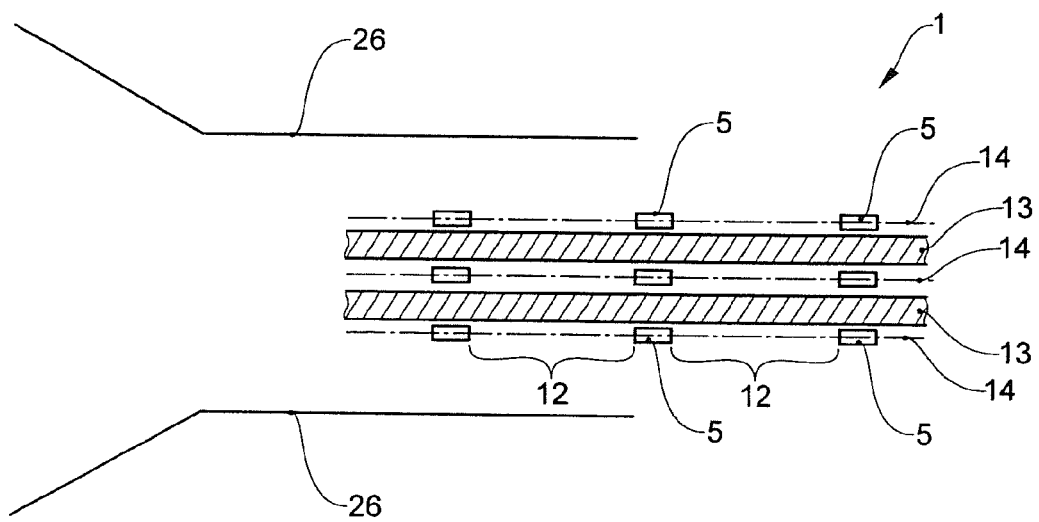

Fig.7
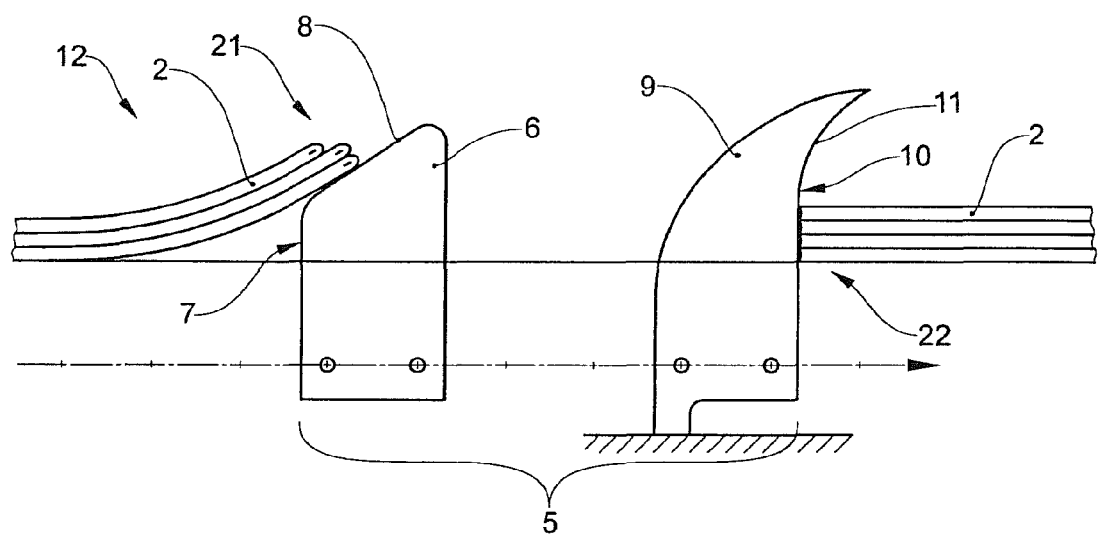
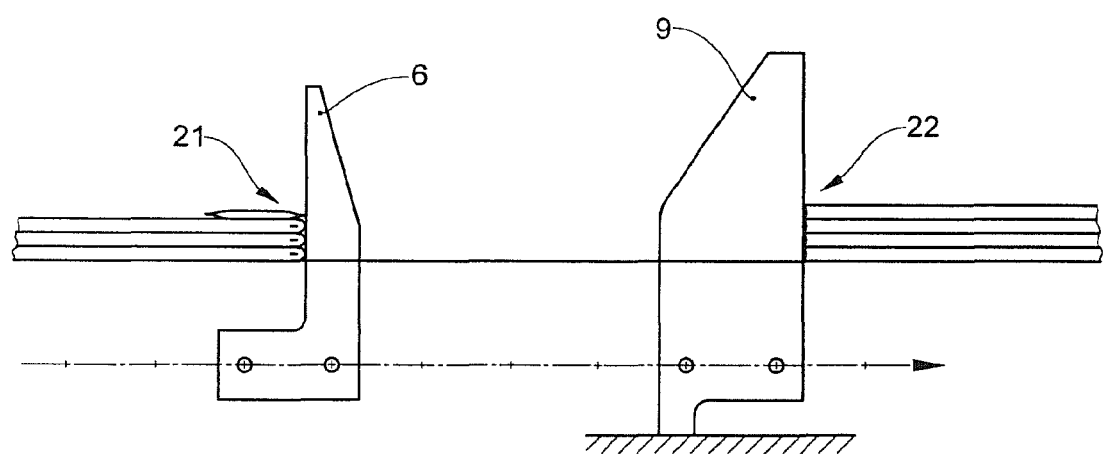

DEVICE AND METHOD FOR CONVEYING AND ALIGNING FLAT PRODUCTS

BACKGROUND OF THE INVENTION

Field of the Invention

The invention relates to the field of conveying technology and in particular to a device and a method for conveying and aligning objects or stacks of flat and optionally also flexible objects such as printed products.

This kind of conveying and alignment device is e.g. known from EP 1 410 992 A1, where flat products are fed into an automated packaging machine by means of a conveying device, wherein a distance between the products is chosen once and then remains given. The flat flexible products or partial-products are preferably individual printed products, may, however, also be CDs or flat sample objects. A stack is formed from individual part-products by placing them on top of each other. The alignment of the trailing edges of the products is realized by means of a respective pusher moved along with the conveying device, the alignment of the leading edges is implemented by briefly holding, at a location of the conveying device, a stop element against the leading edges of the stacks being moved in the conveying direction. Then, the stop element is moved away from the direction of movement of the stacks and then is again moved against the front edge of the next stack. The device can, however, not prevent the stack from slipping apart after being aligned, be it because the stacked products slide on each other, or because the conveying movement is decelerated.

From U.S. Pat. Nos. 6,293,544 and 4,502,592, the conveying of flat objects by means of conveying belts running in parallel is known, wherein one of the conveying belts comprises protruding fingers or stops, which press against the trailing edge. Thus stacks can, while being conveyed, be pushed together. The distance between successive objects may, however, not be changeable.

US 2003/0136086 A1 describes a packaging machine with individually driven conveying elements. Lugs can be leading or trailing lugs, which are movable independently of one another by an electrical linear drive, the lugs being equipped with magnets. In one of the embodiments of the invention, the distance between trailing and leading lugs can be adjusted, in order to erect a cardboard blank to the shape of a box. A leading and a trailing lug may be arranged on a common carrier.

DE 33 35 583 A1 shows a pushing device for the stepwise moving of stacks of paper sheets (or folded sheets) by means of grippers. A leading gripper and a trailing gripper form a gripper pair. At least one of the grippers may be adjustable in order to adapt it to the product. The two grippers are arranged on a carrier which is moved back and forth.

U.S. Pat. No. 5,072,573 describes a transport tray with walls being movable (as seen along the direction of transport) with respect to one another. The movement is controlled by a slotted link.

BRIEF SUMMARY OF THE INVENTION

Thus, it is the object of the invention to provide a device and a method for alignment of products or of stacks of flat and optionally also flexible objects such as the printed products initially mentioned, which does away with the disadvantages named above.

This object is achieved by a device and a method for alignment of products or stacks of flat, optionally also flexible objects, in particular printed products as described below.

The conveying device for conveying and alignment of products or stacks of flat products comprises leading pins (or leading lugs) acting as a stop on a leading edge of the products as well as trailing pins (or trailing lugs) or pushers acting as a stop on a trailing edge of the products. The products are placeable between the leading and trailing pins and thus are aligned. Hereby, a distance between successive pushers is adjustable without parts of the device having to be exchanged.

The distance between successive pushers is equal to the distance between the trailing edges of the products and in the following is also termed cycle distance. It is also possible to vary the cycle distance. Thus, the cycle distance may be adapted to the length of the products in the conveying direction. This product length is approximately equal or slightly shorter than one compartment length defined by the distance between a leading pin and the succeeding pusher. If the cycle distance were not adjustable, with products of shorter length, the distance between adjacent products, also termed product distance in the following, would increase. For processing devices such as e.g. packaging machines, in particular foil packaging machines, which are fed by the conveying device, it is, however desired or required for the product distance to remain equal, regardless of the product length. Due to the cycle distance being adjustable, the product distance may be kept constant even with differing product lengths or, speaking more generally, be adjusted to a predetermined value, in independence of the product length.

The adjustment of the device to a differing cycle distance takes place without having to dismantle the device and parts such as conveying chains with differing pin distances having to be exchanged. Thus, a fast conversion of the device to different product lengths is possible. However, it does not necessarily have to be possible to adapt the cycle distance during operation of the device. In other, the device may have to be stopped in order to change the cycle distance.

Preferably, one pusher and a succeeding leading pin are fixedly connected to one another. They thus form a unit together, termed alignment element and are moved together. The product distance between successive products or stacks of products respectively is determined by the length of the alignment elements in the conveying direction. The cycle distance and the compartment length (corresponding to the product length) are determined by the distance between the alignment elements. Preferably, the alignment elements are in one piece, wherein the leading area acts as a pusher and the trailing area as a leading pin.

In a different preferred embodiment of the invention the product distance is adjustable. This adjustability my e.g. be implemented in that the alignment elements are each conveyed individually and hereby comprise leading and trailing pins movable against each other. The distance between these is e.g. controlled by means of a cam control. Alternatively, the leading and trailing pins may each be transported by own, separate conveying means, as are described in the following for the alignment elements. Thus, here, apart from the distance between the individual pins of a conveying means, the displacement between the pins of the separate conveying means is also predeterminable and adjustable.

In a preferred embodiment of the invention the pushers for achieving an adjustable distance are fixed at regular distances to a circulating conveying means and the distance is adjustable by adjusting the length of the conveying means. Hereby, the conveying means is designed such that a change of length of the entire conveying means is distributed regularly and proportionally over the length. The distance between two successive pins is thus elongated for all pins by the same degree.

When only alignment elements are present, i.e. combined leading pins and pushers, these are conveyable by means of one single conveying means. In practice, usually two or more conveying means running in parallel, laterally in relation to one another with pins moved in parallel and synchronously to one another as separate parts will be provided. If the leading pins and the pushers are provided as separate parts they may also be conveyed on separate conveying means. They are then conveyed as phase-delayed to one another. A distance between leading pins on a first conveying means and pushers on a second conveying means is adjustable by changing the phase-delay between the first and second conveying means. When adjusting the length of the conveying means this happens synchronously for both conveying means. Here again, in practice, at least for each of the pushers and preferably also for each of the leading pins two or more sets of pins running in parallel and synchronously are provided.

In a first preferred variant of this embodiment, the circulating conveying means is flexible and elastic and the distance is adjustable by stretching the conveying means. The conveying means can be a cable or a band or a group of cables or bands and e.g. be formed of an elastic plastic or from metal springs, which connect the succeeding pins to each other. The conveying means e.g. circulates around two deflection rollers, wherein the adjustment of length takes place by adjusting the distance between the deflection rollers, preferably by displacement of a bearing axis of a deflection roller.

In a second preferred variant of this embodiment the circulating conveying means is a buffer chain, i.e. a chain with adjustable distances between the chain links, and the distance to is adjustable by means of a cam and follower mechanism of the conveying means. These kind of buffer chains or conveying devices with controllable distance between the individual conveying elements are e.g. described in the published patent specifications EP 0300 170 and 0 309 702.

Preferably, here again the adjustment of the length of the conveying means is effected by changing the length of a linear conveying track around which the conveying means circulates, i.e. of a conveying track, which runs linearly with a top run (or working run) and a return run between two deflection elements or rollers. Alternatively, for both variants, the deflection elements may be unmovable at the end of the conveying track and the conveying means in the return run may, together with the pins, be guided around one or several further deflection rollers or tensioning rollers, the axis position of which is displaceable for adjustment of the length of the conveying means.

In a different preferred embodiment of the invention, the pins (either the alignment elements or each separately, the pushers and the leading pins) are designed for selective coupling to or decoupling from a circulating conveying means, according to the desired distance between the pins. In a storage position they are decoupled from the conveying means and by means of a release device they are couplable to the conveying means at selectable distances. If the pins are alignment elements, this distance is equal to the cycle distance. If the pins are separate pushers and leading pins transported on the same conveying means this distance is alternately the product distance and the product length. It is, however, also possible for the pushers and leading pins to be conveyed on separate conveying means in a laterally displaced manner. The distances along each conveying means are then each equal to the cycle distance, the pushers are, however, in relation to the leading pins, phase-delayed by the product length or the compartment length. Examples for conveying devices with individually retrievable actuators are described in EP 0 276 409.

The method for conveying and alignment of products or stacks of flat products comprises the steps of:
  pushing the products by their trailing edges by means of trailing pins or pushers;
  holding back the products along their leading edges by means of leading pins;
  aligning the products by means of the pushers and the leading pins;
  adjusting of a distance between successive products by the distance between each of the pushers and the following leading pin holding back the next product, wherein the pusher and the following leading pin are fixedly connected to one another at a fixed distance and thus form an alignment element acting on its leading side as well as on its trailing side.

It is understood that in the embodiments of the invention as described, the conveying of the products is effected by moving the products in a constant direction of conveying, that is, not by moving the products back and forth in a reciprocating movement. Preferably the movement of the pins is essentially continuous, that is, with an at least approximately constant speed, and not with a stepwise or intermittent movement.

Further preferred embodiments correspond to the dependent patent claims. Hereby the characteristics of the method claims are correspondingly combinable with the device claims and vice versa.

BRIEF DESCRIPTION OF THE DRAWINGS

In the following the object of the invention is shown by means of preferred embodiments, which are shown schematically in the enclosed drawings:

FIG. 6 shows a variant of the embodiment of FIG. 3 or 4;

FIG. 7 shows different pin forms; and

FIG. 8 shows a top view on a conveying device.

The reference numerals in the drawings and their denotations are summarized in the reference numeral list. In the figures, identical parts are basically denoted with identical reference numerals.

PREFERRED EMBODIMENTS OF THE INVENTION

Figure 1:
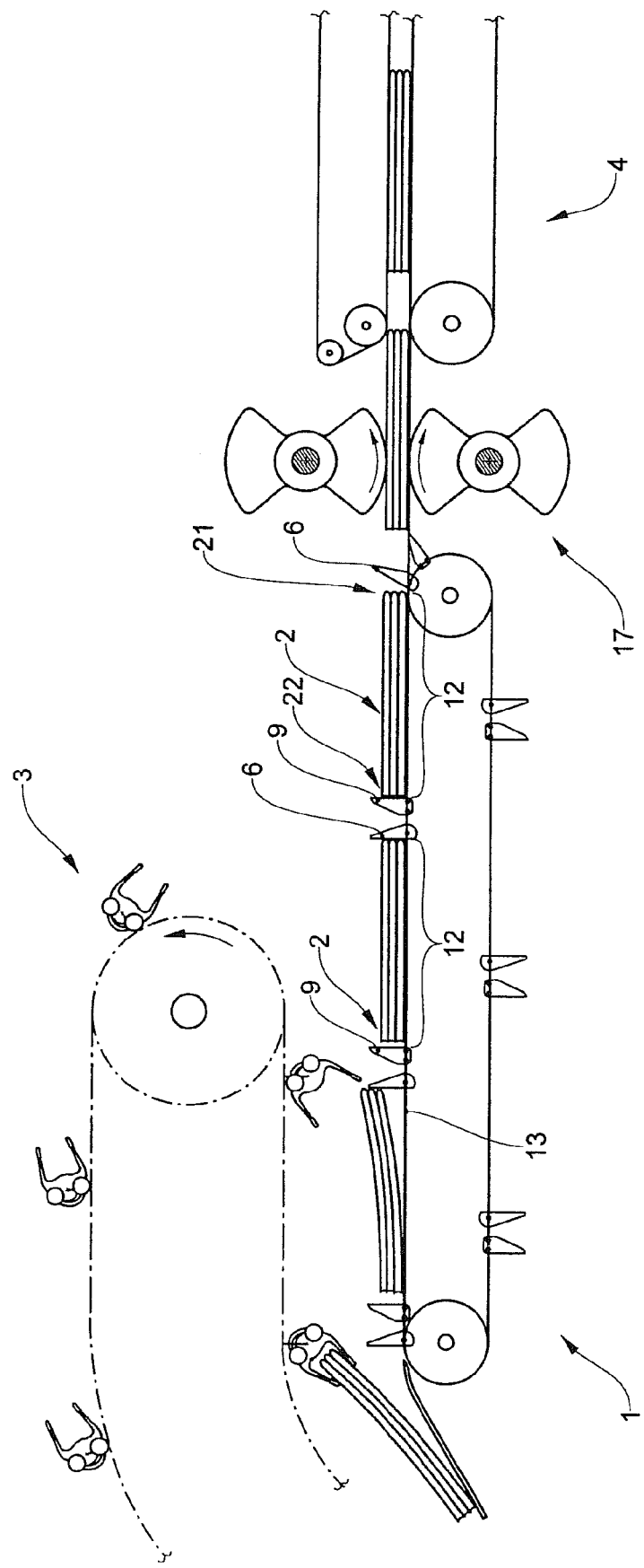
FIG. 1 shows a conveying device according to the invention.

FIG. 1 diagrammatically shows a conveying device according to the invention. The conveying device 1 is installed for transferring products 2 from a feeding device 3 to a processing device 4. The processing device 4 is e.g. a packing machine such as a foiling machine. An acceleration or deceleration installation 17 may be arranged prior to the processing device in the product stream.

The feeding device 3 places the products 2 individually or as stacks or as partial stacks onto the supporting means 13 or product carriers, e.g. sheets. Pins or lugs 6, 9 run in-between and in parallel to these support means 13, preferably on their own conveying means, which pins form interspaces or compartments in-between them for deposit of the products 2. Here and in the following, individual products or stacks are deposited into the compartments. The stacks may be deposited by the feeding device 3 as a whole, or be formed by a succession of several feeding devices 3 (not shown), by successive superposition of several products in the same compartment 12.

The pins are on the one hand pushers 9, which push the products 2 by the trailing product edges 22 in the conveying direction and on the other hand leading pins 6, which limit the movement of the products 2 at the leading product edges 21 in the conveying direction. The length of the products 2 in the conveying direction corresponds to the length of the compartments 12, i.e. the distance between successive leading pins 6 and pushers 9. The length of the compartments is preferably identical or somewhat longer than the product length. When products 2 of differing lengths are stacked or are being stacked, the length of the longest product 2 determines the length of the compartment.

The pins may, in relation to the respective conveying means, be arranged fixedly or such that they, e.g. controlled by a cam, emerge from the conveying means or descend relative to the conveying means in a defined location along their trajectory.

Figure 2:
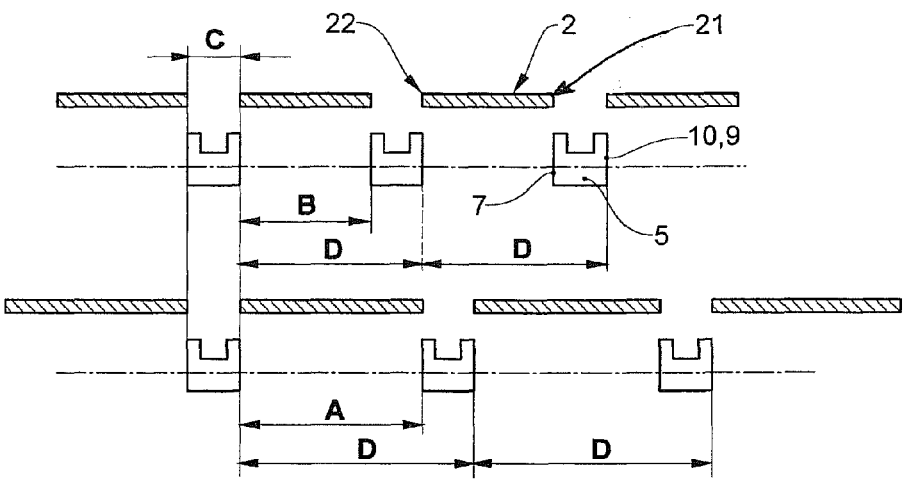
FIG. 2 shows different adjustments of the cycle distance.

FIG. 2 schematically shows different adjustments of the cycle distance D between successive trailing product edges 22. The cycle distance D is adaptable to differing product lengths or compartment lengths A, B. A distance or interspace between products 2, more precisely, between the trailing product edge 22 of the first product and the leading product edge 21 of a successive second product 2 is termed product distance C in the following. This product distance C may be predetermined by the subsequent processing process. In particular, it may be desirable that the product distance C is not dependent on the product length A, B. Otherwise, short products would lead to longer product distances. By adaptation of the cycle distance D to the product length A, B a constant product distance C is achievable.

Figure 3:
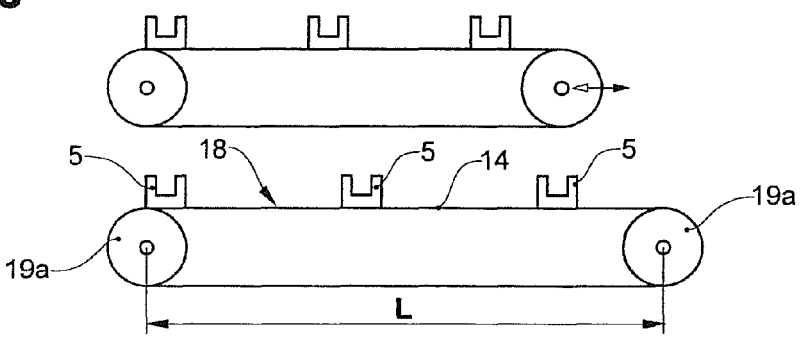
FIG. 3 shows a schematic diagram of an embodiment of the invention with an elastic traction element.

FIG. 3 shows a schematic diagram of an embodiment of the invention with a traction element 14, adjustable in length and hereby elastic, in two positions. The traction element hereby is preferably an elastic cable or band 14, e.g. made of rubber or plastic. It runs around at least two deflection rollers 19a, which form the passage from the conveying track 18 on the working run to the return run and determine a length L of the conveying track 18. Between the deflection rollers 19a, the cable or band 14 runs substantially along a linear trajectory, wherein it may also be supported by supporting rollers (not shown). At least one of the deflection rollers is movable in this linear direction, such that the distance between the deflection rollers 19a is adjustable. By means of the elasticity of the cable or the band 14, the change in length is distributed evenly along the circumference of the conveying device 1 and thus also along the distances between alignment elements 5 fixed to the cable or band 14. Thus, the compartment length A, B is also adjustable in a simple manner. Preferably, the deflection roller 19a which is located on the side for transferring the products 2 to the processing device 4 is arranged in a stationary manner, and the opposite deflection roller 19a is movable in the longitudinal direction of the conveying track 18.

Figure 4:
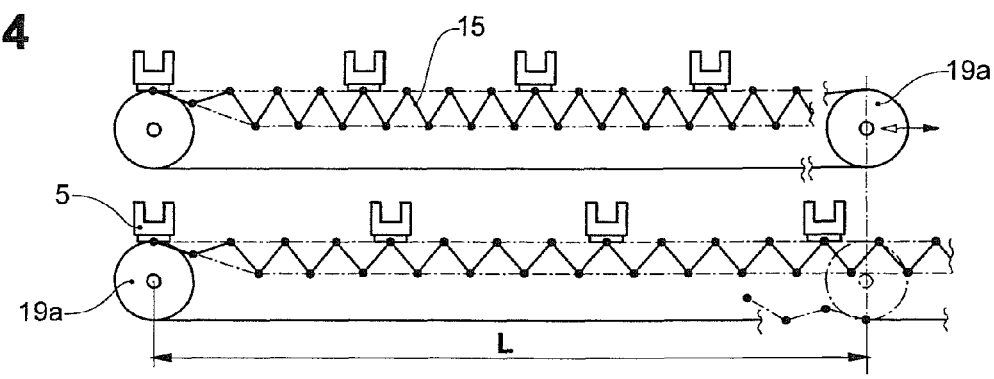
FIG. 4 shows a schematic diagram of an embodiment of the invention with a traction element adjustable in its length.

FIG. 4 shows a schematic diagram of an embodiment of the invention with a conveying element 15 adjustable in length in two positions. The conveying element 15 conveys the alignment elements 5 and is designed as a buffer chain construction, i.e. with adjustable distance between the chain links. Here, the change in length of the traction element and the distribution of the change in length over the compartment length A, B is effected by means of a cam and follower control (not shown).

Figure 5:
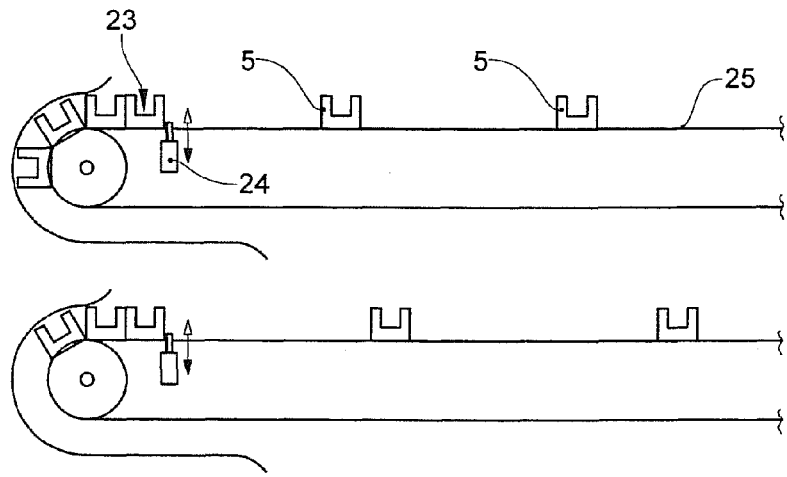
FIG. 5 shows a schematic diagram of an embodiment of the invention with freely determinable pin distances.

FIG. 5 shows a schematic diagram of an embodiment of the invention with freely determinable distances between the pins, in operation with a first and a second product distance: the alignment elements 5 are selectively couplable, by means of a clamping mechanism or locking device, to a conveying means, in particular a flexible but not substantially elastic conveying means such as e.g. a traction cable 25. The coupling is controlled by means of a release device 24. Before the release device 24, returning alignment elements 5 are retained in a storage position and released in a controlled manner, such that the desired compartment length A, B is formed. Measurement of the compartment length and release of the alignment elements 5 can be effected by means of mechanical, electric, pneumatic or a combination of such elements.

FIG. 6 diagrammatically shows a variant of the embodiment of FIG. 3 or 4 in two positions. Here, the two deflection rollers 19a are stationary and the length adjustment is achieved by means of adjustment of a further roller or tensioning roller 19b, over which the return run 20 runs. In the shown example, the axis of the tensioning roller 19b is dislocated in perpendicular to the connection line between the deflection rollers 19b. An analogue effect can also be achieved with more than one tensioning roller 19b. This tensioning principle may also be applied to the embodiment of FIG. 4.

FIG. 7 shows different pin or lug shapes. In the upper example, a leading pin 6 is sloped on its rear or trailing surface 7 or fitted with a sloped surface 8 respectively. Thus conveyed products 2, with their leading product edge, slip into the compartment 12 in-between the pins 6, 9 more easily, in particular if they are accelerated by the conveying device. A pusher 9 comprises a forwardly or frontwardly inclined alignment surface 11 on the front or leading surface 10. By means of the frontwardly inclined surface 11, the products 2 are held together better at their trailing product edges 22. In the bottom example, the leading and trailing surfaces are perpendicular to the conveying direction. The pusher 9 is designed to be larger than the leading pin 6 in order to be able to absorb larger forces.

FIG. 8 diagrammatically shows a top view onto a conveying device 1 with traction elements 14 running in parallel to one another, and alignment elements 5 attached to these traction elements 14, as well as optional support means 13 for receiving and supporting the products. On both sides of the traction elements and support means alignment sheet metal plates or alignment bands 26 for lateral alignment of the products are arranged. In the case in which there are leading pins 6 being conveyed by at least a first of the conveying means and pushers 9 being conveyed separately and phase-delayed by at least a second of the conveying means, for example the middle traction element 14 (and further parallel traction elements, not shown), serving as a first conveying means, may carry leading pins 6 instead of a complete alignment element, and the two outer traction elements 14 (and further parallel traction elements, not shown), serving as second conveying means, may carry pushers 9.

REFERENCE NUMERAL LIST 1 conveying device
2 product
3 feeding device
4 processing device
5 alignment pin, alignment element 6 leading stop
7 trailing surface
8 sloped surface
9 leading stop, pusher
10 leading surface
11 forwardly inclined alignment surface
12 compartment
13 support means
14 elastic cable
15 conveying element
17 acceleration or deceleration installation
18 conveying track
19a deflection rollers
19b tensioning rollers
20 return track, return run
21 leading product edge
22 trailing product edge
23 storage position
24 release device
25 traction cable (not elastic)
26 alignment sheets
A, B distance between pushers, compartment length
C product distance
D cycle distance
L length of the conveying track

The invention claimed is:

1. A conveying device for conveying and aligning flat and optionally flexible products or stacks of flat products comprising:
   leading pins acting as a stop on a leading edge of conveyed products, and
   trailing pins or pushers acting as a stop on a trailing edge of the conveyed products,
   wherein the products are placeable between the leading and trailing pins and thereby are conveyed and aligned,
   wherein a distance between successive pushers is adjustable without parts of the device having to be exchanged
   wherein the pushers, for achieving an adjustable distance at regular distances, are arranged along a circulating conveying means and the distance is adjustable by adjusting a length of the conveying means.

2. The conveying device according to claim 1, wherein one respective pusher and a successive leading pin are fixedly connected to one another, thus together form a alignment element and are moved together and define an interspace between successive products or product stacks respectively.

3. The conveying device according to claim 2, wherein one alignment element comprises a one-piece alignment body, a leading surface of which acts as pusher and the trailing surface of which acts as leading pin.

4. The conveying device according to claim 3, wherein the leading surface of the pusher or an alignment body is inclined forwards in the conveying direction.

5. The conveying device according to claim 3, wherein the trailing surface of the pusher or an alignment body is sloped in the conveying direction.

6. The conveying device according to claim 1, wherein the circulating conveying means is flexibleand elastic and the distance is adjustable by stretching the conveying means.

7. The conveying device according to claim 1, wherein the circulating conveying means is a chain with adjustable distance between the chain links and the distance is adjustable by a cam and follower mechanism of the conveying means.

8. The conveying device according to claim 1, wherein the adjustment of the length of the conveying means is effected by changing a length of a linear conveying track around which the conveying means circulates.

9. The conveying device according to claim 1, wherein the adjustment of the length of the conveying means is effected by changing a position of tensioning rollers around which the conveying means circulates on a return of a linear conveying track.

10. The conveying device according to claim 1, wherein the pins are designed for selective coupling to or decoupling from a circulating conveying means, are decoupled from the conveying means in a storage position, and are couplable to the conveying means by means of a release device at selectable distances.

11. A method for conveying and aligning flat and optionally flexible products or stacks of flat products comprising the steps of:
   pushing the products by their trailing edges by means of leading pins or pushers;
   holding back the products along their leading edges by means of leading pins;
   conveying and aligning the products by the pushers and the leading pins;
   adjusting of a distance of successive products by the distance between each of the pushers and the following leading pin holding back the next product, wherein the pusher and a following leading pin are connected to each other at a fixed distance and thus form an alignment element acting on both a leading side and a trailing side of adjacent products or stacks of products; and
   adjusting the distance by changing a length of a conveying means, along which the alignment means are affixed at regular distances.

12. The method according to claim 11, comprising the step of adjusting a distance between successive alignment elements according to a length of the products or the stacks along a conveying direction.

13. The method according to claim 11, further comprising the step of adjusting the distance by means of controlled coupling of the alignment elements to a circulating conveying means according to the desired distance.

* * * * *